US008965679B2

(12) United States Patent
Euteneuer et al.

(10) Patent No.: US 8,965,679 B2
(45) Date of Patent: Feb. 24, 2015

(54) SYSTEMS AND METHODS FOR UNMANNED AIRCRAFT SYSTEM COLLISION AVOIDANCE

(71) Applicant: Honeywell International Inc., Morristown, NJ (US)

(72) Inventors: Eric Euteneuer, St. Anthony Village, MN (US); Michael Ray Elgersma, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 136 days.

(21) Appl. No.: 13/781,247

(22) Filed: Feb. 28, 2013

(65) Prior Publication Data

US 2014/0249738 A1    Sep. 4, 2014

Related U.S. Application Data

(60) Provisional application No. 61/658,202, filed on Jun. 11, 2012.

(51) Int. Cl.
*G08G 5/04* (2006.01)
*G01S 13/93* (2006.01)
(Continued)

(52) U.S. Cl.
CPC ......... *G01S 13/9303* (2013.01); *B62D 15/0265* (2013.01); *G05D 1/101* (2013.01); *G08G 5/0069* (2013.01); *G08G 5/045* (2013.01); *G01S 5/0072* (2013.01); *G08G 5/0013* (2013.01)
USPC ........... 701/301; 701/120; 701/122; 701/408; 342/29; 342/30; 342/451; 340/961; 702/150; 702/94; 702/95

(58) Field of Classification Search
CPC . G08G 5/045; B62D 15/0265; G01S 13/9303
USPC .......................................................... 701/301
See application file for complete search history.

(56) References Cited

U.S. PATENT DOCUMENTS 3,774,213 A * 11/1973 Riggs ............................ 342/458
6,081,764 A *  6/2000 Varon ........................... 701/120
(Continued)

FOREIGN PATENT DOCUMENTS

GB          2450987 A    1/2009

OTHER PUBLICATIONS

European Organisation for the Safety of Air Navigation; Unmanned Aircraft Systems—ATM Collision Avoidance Requirements; Edition No. 1.3; Edition Date May 17, 2010; Document Identifier CND/CoE/CN/09-156; 103 Pages.

(Continued)

*Primary Examiner* — John R Olszewski
*Assistant Examiner* — Mohsen Ghajargar
(74) *Attorney, Agent, or Firm* — Shumaker & Sieffert, P.A.

(57) ABSTRACT

Systems and methods are operable maintain a proscribed Self Separation distance between an unmanned aircraft system (UAS) and an object. In an example system, consecutive intruder aircraft locations relative to corresponding locations of a self aircraft are determined, wherein the determining is based on current velocities of the intruder aircraft and the self aircraft, and wherein the determining is based on current flight paths of the intruder aircraft and the self aircraft. At least one evasive maneuver for the self aircraft is computed using a processing system based on the determined consecutive intruder aircraft locations relative to the corresponding locations of the self aircraft.

19 Claims, 7 Drawing Sheets

(51) Int. Cl.
  *B62D 15/02* (2006.01)
  *G05D 1/10* (2006.01)
  *G08G 5/00* (2006.01)
  *G01S 5/00* (2006.01)

(56) References Cited

U.S. PATENT DOCUMENTS

| | | | | |
|---|---|---|---|---|
| 6,133,867 | A * | 10/2000 | Eberwine et al. | 342/29 |
| 6,262,679 | B1 * | 7/2001 | Tran | 342/29 |
| 6,314,366 | B1 * | 11/2001 | Farmakis et al. | 701/482 |
| 6,604,044 | B1 * | 8/2003 | Kirk | 701/120 |
| 6,785,610 | B2 * | 8/2004 | Baker et al. | 701/301 |
| 8,725,402 | B2 * | 5/2014 | Hoy | 701/301 |
| 8,768,540 | B2 * | 7/2014 | Stone et al. | 701/3 |
| 8,831,906 | B1 * | 9/2014 | Alon et al. | 702/150 |
| 2002/0152029 | A1 * | 10/2002 | Sainthuile et al. | 701/301 |
| 2004/0059504 | A1 * | 3/2004 | Gray | 701/301 |
| 2006/0058931 | A1 * | 3/2006 | Ariyur et al. | 701/23 |
| 2006/0167596 | A1 * | 7/2006 | Bodin et al. | 701/3 |
| 2006/0290562 | A1 * | 12/2006 | Ehresman | 342/41 |
| 2007/0106473 | A1 * | 5/2007 | Bodin et al. | 701/301 |
| 2007/0171042 | A1 * | 7/2007 | Metes et al. | 340/521 |
| 2008/0021647 | A1 * | 1/2008 | Daveze et al. | 701/301 |
| 2008/0027647 | A1 * | 1/2008 | Ansell et al. | 701/301 |
| 2008/0249669 | A1 * | 10/2008 | Skarman | 701/3 |
| 2009/0027253 | A1 * | 1/2009 | van Tooren et al. | 342/29 |
| 2009/0088972 | A1 * | 4/2009 | Bushnell | 701/210 |
| 2010/0039310 | A1 * | 2/2010 | Smith et al. | 342/29 |
| 2010/0292871 | A1 * | 11/2010 | Schultz et al. | 701/3 |
| 2011/0118980 | A1 * | 5/2011 | Hoy | 701/301 |
| 2011/0118981 | A1 * | 5/2011 | Chamlou | 701/301 |
| 2011/0160950 | A1 * | 6/2011 | Naderhirn et al. | 701/28 |
| 2011/0288773 | A1 * | 11/2011 | Hoy | 701/301 |
| 2012/0143488 | A1 * | 6/2012 | Othmezouri et al. | 701/301 |
| 2012/0158219 | A1 * | 6/2012 | Durling et al. | 701/4 |
| 2012/0203450 | A1 * | 8/2012 | Meyer et al. | 701/301 |
| 2012/0209457 | A1 * | 8/2012 | Bushnell | 701/13 |
| 2013/0124076 | A1 * | 5/2013 | Bruni et al. | 701/120 |
| 2014/0249738 | A1 * | 9/2014 | Euteneuer et al. | 701/301 |

OTHER PUBLICATIONS

Andrew R. Lacher et al.; Unmanned Aircraft Collision Avoidance—Technology Assessment and Evaluation Methods; The MITRE Corporation; 2007; 10 Pages.
Andrew Zeitlin et al.; Collision Avoidance for Unmanned Aircraft: Proving the Safety Case; MITRE No. MP060219; Lincoln Laboratory No. 42PM ATC-329; Oct. 2006; 12 Pages.
Examination Report from counterpart European Patent Application No. 13167393.1, dated Jul. 30, 2014, 8 pp.
European Search Report from counterpart European Application No. 13167393.1, dated Mar. 14, 2014, 4 pp.
Response to Examination Report dated Jul. 30, 2014, from Counterpart European Patent Application No. 13167393.1, filed Nov. 10, 2014, 23 pp.

* cited by examiner

SYSTEMS AND METHODS FOR UNMANNED AIRCRAFT SYSTEM COLLISION AVOIDANCE

PRIORITY CLAIM

This application claims the benefit of U.S. Provisional Application Ser. No. 61/658,202, filed Jun. 11, 2012, the contents of which are hereby incorporated by reference in their entirety.

BACKGROUND OF THE INVENTION

Aircraft employ a see and avoid function to mitigate the likelihood of mid-air collisions with other aircraft, referred to herein as an intruder aircraft, as required by Title14 Code of Federal Regulations (14 CFR) 91.111, 91.113, 1n3 91.181. When intruder aircraft approach the self aircraft, the crew may change their current flight path to a modified flight path so as to maintain a safe amount of separation between their aircraft and the intruder aircraft. The crew may effect a maneuver to maintain a safe separation distance from the intruder aircraft operating in the airspace. Although the "see and avoid" requirements stated in 14 CFR 91.111, 91.113, and 91.181 are described as right of way rules, the intent is to avoid collisions with other aircraft and to remain "well clear". The function to avoid collisions shall be referenced Collision Avoidance. The function to remain "well clear" shall be referenced as Self Separation.

Guidelines for aircraft Self Separation may be used to pass well clear of the intruder aircraft in proximity to the self aircraft. Right-of-way rules as outlined in 14 CFR 91.113 may provide guidance to the crew of the self aircraft so that they determine an appropriate right turn or a left turn, referred to herein as lateral maneuvering.

On occasion, an intruder aircraft may come dangerously close to the self aircraft so as to present a possibility of a mid-air collision. Collision Avoidance rules define procedures for the crew to take to avoid mid-air collisions when their manned aircraft becomes too close to an intruder aircraft. Vertical maneuvering may be recommended by electronic-based collision avoidance systems to advise pilots to ascend or descend, referred to herein as a vertical maneuver, so that their manned aircraft will pass above or below the intruder aircraft so as to avoid a mid-air collision. Some collision avoidance systems may even automatically initiate a vertical flight maneuver.

In a manned aircraft situation, the crew of the manned aircraft realize, on occasion, that a modified flight path based on right-of-way rules may not be optimal. The crew of the manned aircraft have the choice to select an alternative modified flight path based upon the crew exercising good judgment in view of their known flight path and the flight paths of other intruder aircraft operating in their vicinity. Such good judgment is based on the experience and common sense of the crew. For example, rather than implementing a lateral maneuver by turning right in accordance with 14 CFR 91.113, the crew may implement an alternative lateral maneuver by turning left.

However, the absence of the crew in an unmanned aircraft system (UAS) [also known as unmanned aircraft vehicle (UAV)] complicates the process of maintaining safe separation between the UAS and other aircraft. Here, the operator of the UAS is remote from the UAS. Accordingly, the remote UAS operator must rely on various electronic-based systems, such as radar and/or imaging technologies, to be aware of other aircraft in the vicinity of the UAS.

Legacy flight control algorithms operating a traditional UAS are not able to exercise good judgment to arrive at a conclusion that a modified flight path may be preferred over a modified flight path that is based 14 CFR 91.113. Hopefully, the remote UAS operator's situational awareness will be sufficiently high so that the remote UAS operator will realize the potential danger of turning the UAS onto a less than optimal modified flight path, and alternatively, realize that a different modified flight path may be preferred. However, reliance on a remote UAS operator, who may even be operating multiple UASs, to exercise good judgment in all circumstances may not be acceptable, especially in regions of airspace with high levels of aircraft traffic. Accordingly, there is a need in the arts to automatically emulate right-of-way rules using electronic systems in a fashion that more closely emulates the good judgment that would be exhibited by a crew onboard a manned aircraft.

SUMMARY OF THE INVENTION

Systems and methods are operable to maintain a safe separation distances between a self aircraft, such as an unmanned aircraft system (UAS), and an object. An exemplary embodiment monitors an intruder aircraft and a self aircraft; determines a closest point of approach (CPA) between the intruder aircraft and the self aircraft in response to the separation distance becoming less than the Self Separation Threshold (SST); determines whether the separation distance between the intruder aircraft and the self aircraft is greater than a Collision Avoidance Threshold (CAT); and in response to the separation distance becoming less than the SST distance and in response to determining that the separation distance is greater than the CAT distance (or more generally the intruder aircraft not being in the CAT volume, which need not be spherical), determines whether the intruder aircraft's CPA is to the left of a flight path of the self aircraft or to the right of the flight path of the self aircraft, wherein the self aircraft turns left when the intruder aircraft's CPA is determined to be to the right of the flight path of the self aircraft, and wherein the self aircraft turns right when the intruder aircraft's CPA is determined to be to the left of the flight path of the self aircraft.

In another example embodiment, consecutive intruder aircraft locations relative to corresponding locations of a self aircraft are determined, wherein the determining is based on current velocities of the intruder aircraft and the self aircraft, and wherein the determining is based on current flight paths of the intruder aircraft and the self aircraft. At least one evasive maneuver for the self aircraft is computed using a processing system based on the determined consecutive intruder aircraft locations relative to the corresponding locations of the self aircraft. The at least one evasive maneuver comprises one of a left turn and a right turn.

BRIEF DESCRIPTION OF THE DRAWINGS

Preferred and alternative embodiments are described in detail below with reference to the following drawings.

DETAILED DESCRIPTION OF THE PREFERRED EMBODIMENT

Embodiments of the sense and avoid system are configured to maintain separation distances between a self aircraft, such as, but not limited to, an unmanned aircraft system (UAS), and one or more objects of interest while the self aircraft is in flight. The UAS is configured to fly over terrain without a crew. Objects of interest include intruder aircraft, restricted airspace, terrain, weather, or the like. Embodiments of the sense and avoid system monitor current separation distances between the self aircraft and one or more objects of interest (the distance between the self aircraft and the object of interest at any given current time). The monitoring is performed by periodically determining a current separation distance between the intruder aircraft and the self aircraft (wherein the current separation distance is a distance between the intruder aircraft and the self aircraft is determined at a current time), and comparing the current separation distance to a Self Separation Threshold (SST), wherein the SST is a predefined distance between the intruder aircraft and the self aircraft. The monitoring determines when the monitored separation distance equals the SST. The monitoring may be periodically performed based on a predefined duration. In some embodiments, the predefined duration may be so short that the monitoring is done on a continuous basis.

In the event that the separation distance associated with an object of interest comes to a value that is within (equal to) a predefined distance to the self aircraft, a closest point of approach (CPA) between the self aircraft and the object of interest is determined. Then, right-of-way rules of the road are emulated such that the self aircraft turns away from the object of interest so as to maintain a safe separation distance. That is, a lateral maneuver (a right turn or a left turn) may be determined and/or recommended by the sense and avoid system. These lateral maneuvers may, in some instances, be contrary to 14 CFR 91.113.

If the object of interest is an intruder aircraft, the CPA is based on a projected current flight path of the intruder aircraft and the planned current flight path of the self aircraft. If the object has a fixed location, then the CPA is based on the fixed location of the object.

Figure 1:
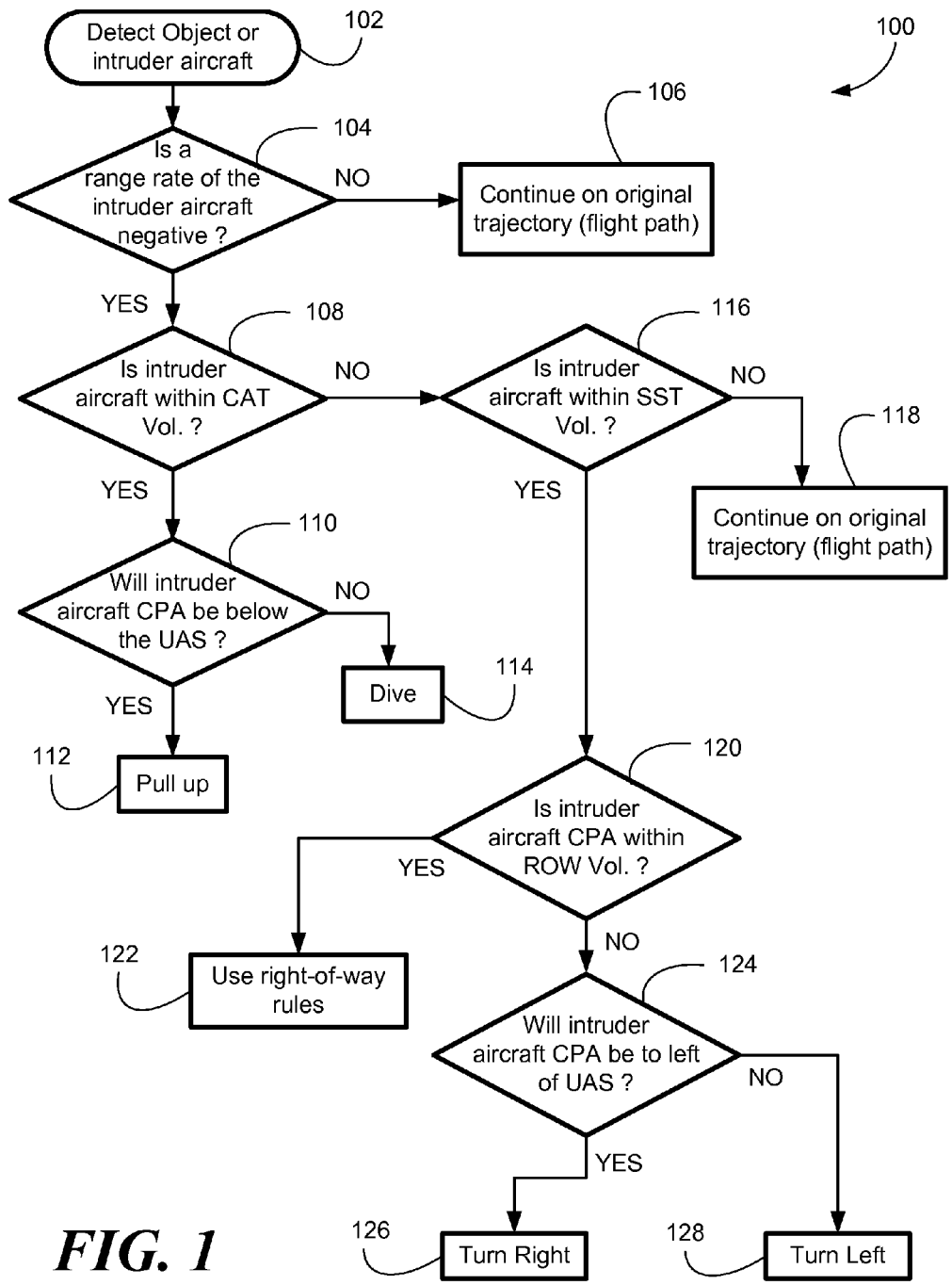
FIG. 1 is a flowchart illustrating the operation of software logic that may be used to implement an example sense and avoid system for a single intruder aircraft.

FIG. 1 is a flowchart 100 illustrating operation of exemplary software logic that may be used to implement an example embodiment of the sense and avoid system for a single intruder aircraft. Here, the process of FIG. 1 assumes that there is only one intruder aircraft that is in proximity to the UAS. Other aircraft are outside of an area of interest with respect to the present embodiments which are principally concerned with the detection and avoidance of intruder aircraft.

In this regard, each block may represent a module, segment, or portion of code, which comprises one or more executable instructions for implementing the specified logical function(s). It should also be noted that in some alternative implementations, the functions noted in the blocks may occur out of the order noted in FIG. 1, may include additional functions, and/or may omit some functions. For example, two blocks shown in succession in FIG. 1 may in fact be executed substantially concurrently, the blocks may sometimes be executed in the reverse order, or some of the blocks may not be executed in all instances, depending upon the functionality involved. All such modifications and variations are intended to be included herein within the scope of this disclosure.

Example embodiments of the sense and avoid system are described below in the context of implementation in a UAS. Alternative embodiments are equally applicable to other types of self aircraft, including manned aircraft. Also, example objects of interest are described below in the context of one or more intruder aircraft, though alternative embodiments and the descriptions herein are equally applicable to other types of objects of interest, including restricted airspace, terrain, and/or weather.

With respect to FIG. 1, the process of the flowchart 100 begins at block 102 in response to detecting an intruder aircraft (or other object of interest). At block 104, a determination is made if the detected intruder aircraft is getting closer to the UAS (the range rate is negative). If the detected intruder aircraft is getting farther from the UAS (the range rate is positive), the UAS continues along its original trajectory (current flight path), as indicated at block 106. However, if the range rate is negative (the YES condition), the process continues to block 108. In an example embodiment, determining a current separation distance between an intruder aircraft and a self aircraft is performed if the range rate is negative, and is not performed in the range rate is positive.

At block 108, a determination is made whether the detected intruder aircraft is within a Collision Avoidance Threshold (CAT) of the UAS. If the intruder aircraft is within the CAT (the YES condition), a closest point of approach (CPA) is then determined and the process proceeds to block 110.

At block 110, a determination is made whether the intruder aircraft is below the UAS. If the intruder aircraft is below the UAS (the YES condition), the UAS pulls up (implements a vertical maneuver that increases altitude of the UAS) as indicated at block 112. If the intruder aircraft is not below the UAS (the NO condition), the UAS dives (implements a vertical maneuver that decreases altitude of the UAS) as indicated by the block 114.

Alternatively, if at block 108, the intruder aircraft is not within the CAT volume (the NO condition), the process proceeds to block 116. At block 116, a determination is made whether the intruder aircraft is inside a Self Separation Threshold (SST) volume. Here, a separation distance between an intruder aircraft and a self aircraft is monitored, and the separation distance is then compared to the SST to determine if the separation distance has become less than the SST. The proscribed self separation distance defined by the SST volume is defined as a minimum distance and/or time that the UAS should maneuver from all other intruder aircraft at all times during its flight. If not (the NO condition), the UAS continues along its original trajectory (current flight path), as indicated at block 118. However, if the intruder aircraft is within the SST volume (the YES condition), the CPA is determined and the process proceeds to block 120.

At block 120, a determination is made whether the intruder aircraft is within a right-of-way (ROW) volume. If the intruder aircraft is within the ROW volume (the YES condition), the UAS implements a lateral maneuver in accordance with ROW rules as indicated at block 122. That is, the UAS implements a lateral maneuver to turn the UAS to the left or the right with respect to the intruder aircraft. If at block 120 the intruder aircraft is not within the ROW volume (the NO condition), the process proceeds to block 124.

At block 124, a determination is made whether the CPA indicates that the intruder aircraft will be to the left of the UAS. If the intruder aircraft is to the left of the UAS (the YES condition), the UAS turns to the right, as indicated by block 126. On the other hand, if the intruder aircraft is not to the left of the UAS (the NO condition), the UAS turns to the left, as indicated by block 128. These lateral maneuvers in accordance with blocks 126, 128 may, in some instances, be contrary to established right-of-way rules (as outlined in 14 CFR 91.113). In other instances, the lateral maneuvers of blocks 126, 128 will result in the same turn directions of established right-of-way rules indicated at block 122.

The CAT, the SST and the ROW are described as volumes. Alternatively, the CAT, the SST and/or the ROW can be expressed as a one-dimensional vector from the UAS or a two-dimensional area about the UAS. In the figures herein, the CAT, SST and/or ROW are illustrated as two-dimensional areas. The illustrated two-dimensional areas may be circular, may be elliptical, or have another shape, depending upon the embodiment. Similarly, volumes of the CAT, the SST and/or the ROW may be spherical, may be egg shaped (when a portion of the volume has an elliptical cross section), or have another shape.

Figure 2:
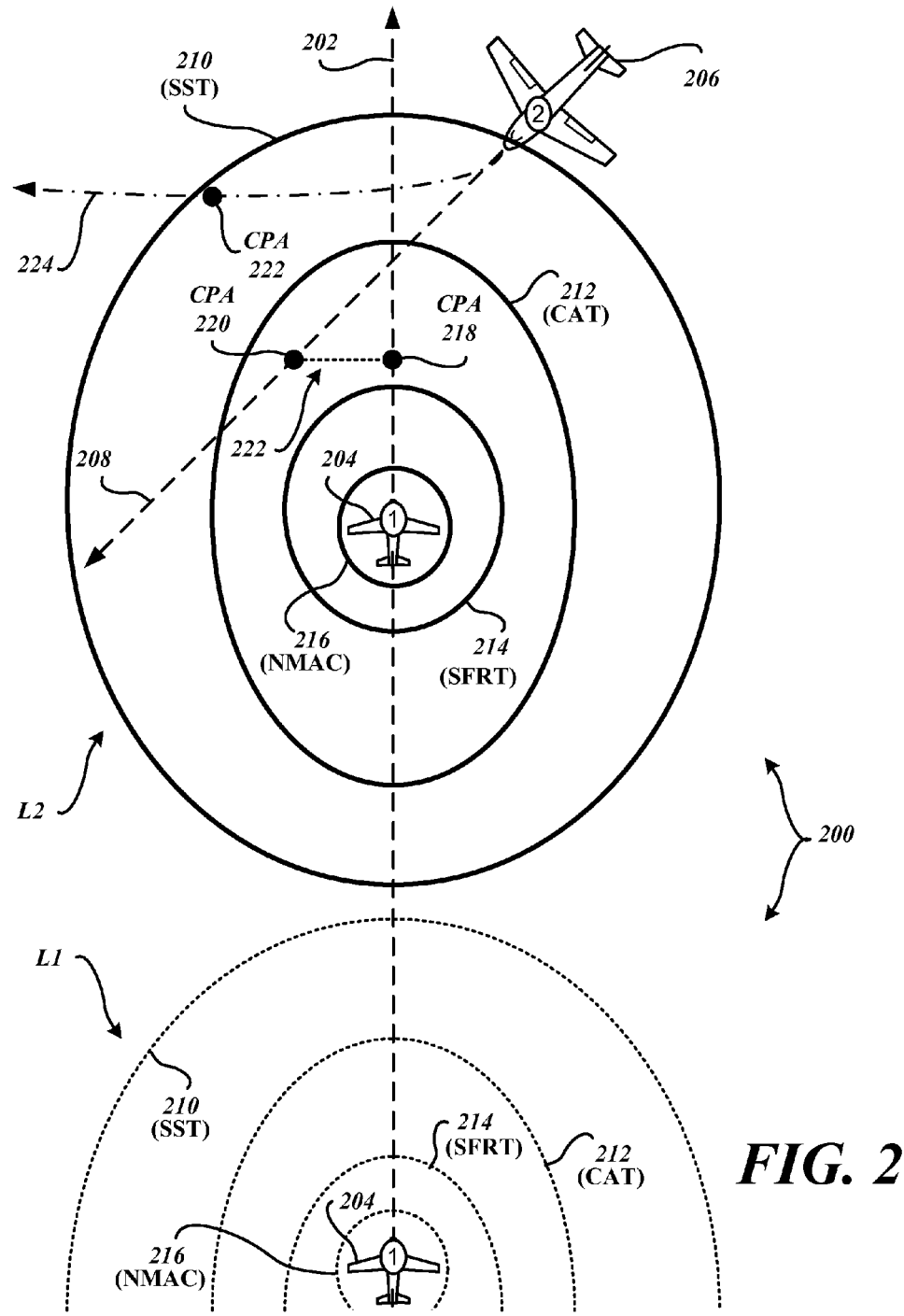
FIG. 2 is a simplified hypothetical plan view of a current flight path of an unmanned aircraft system (UAS) operating in accordance with an embodiment of a sense and avoid system.

FIG. 2 is a simplified hypothetical plan view of a current flight path 202 of an unmanned aircraft system (UAS) 204 operating in accordance with an embodiment of a sense and avoid system 200. The UAS 204 is controlled by an operator at a ground-based operation facility (not shown). The operator is operating electronic-based control devices that generate control commands that are communicated to the UAS 204 via wireless signals. FIG. 2 illustrates the UAS 204 at two different respective locations, $L_1$ and $L_2$, from the intruder aircraft 206 at a current time.

Embodiments of the sense and avoid system 200 are configured to maintain self separation distances between the UAS 204 and objects, such as the example intruder aircraft 206, while the UAS 204 is in flight. The example intruder aircraft 206 is illustrated as traveling along its respective flight path 208.

In an example embodiment, a Self Separation Threshold (SST) 210 volume (illustrated as a two-dimensional area) is defined about the UAS 204. A Collision Avoidance Threshold (CAT) 212 volume (illustrated as two-dimensional area) is also defined about the UAS 204. Additionally, an optional standard flight rules threshold (SFRT) 214 volume and a near-miss avoidance collision (NMAC) threshold 216 (illustrated as two-dimensional areas) are defined about the UAS 204.

The SST 210 defines a proscribed Self Separation distance for the UAS 204. The SST 210 is predefined as a Self Separation Threshold boundary about the UAS 204 so that a safe separation distance is maintained between the UAS 204 and an object of interest, such as the example intruder aircraft 206. In some embodiments, the SST 210 may include an optional amount of desirable margin. If an object, such as the example intruder aircraft 206, is outside of the SST 210 at a current time, then the UAS 204 does not deviate from its current and/or planned flight path 202.

Embodiments of the sense and avoid system 200 monitor a current separation distance between the UAS 204 and one or more objects of interest, such as the example intruder aircraft 206. The current separation distance is a distance between the intruder aircraft and the self aircraft at a current time that the monitoring is performed. When the intruder aircraft 206 comes within a predefined distance to the UAS 204, here the SST 210, embodiments of the sense and avoid system 200 initiate a comparative analysis of the projected flight path 208 of the intruder aircraft 206 and the projected flight path 202 of the UAS 204 to determine a closest point of approach (interchangeably referred to as the CPA).

That is, the CPA is determined in response to the separation distance becoming less than the SST. Also, a determination is made whether the current separation distance between the intruder aircraft 206 and the UAS 204 is greater than the CAT. In response to the current separation distance becoming less than the SST and in response to determining that the current separation distance is greater than the CAT, a determination is made whether the CPA to the intruder aircraft 206 is to the left of a current flight path of the UAS 204 or to the right of the current flight path of the UAS 204. The UAS 204 turns left when the CPA to the intruder aircraft 206 is determined to be to the right of the current flight path of the UAS 204. The UAS 204 turns right when the CPA to the intruder aircraft 206 is determined to be to the left of the current flight path of the UAS 204. That is, based on the determined closest point of approach, a recommended lateral maneuver for the UAS 204 is determined.

FIG. 2 illustrates that at the first location $L_1$, the intruder aircraft 206 has not intersected the SST 210 of the UAS 204. That is, the monitored separation distance between the UAS 204 and the intruder aircraft 206 is greater that the SST 210. Accordingly, the UAS 204 does not deviate from its current flight path 202. (Nor, at this juncture, is the CPA of the intruder aircraft 206 to the UAS 204 being computed or determined).

It is apparent from FIG. 2, that at the hypothetical second location $L_2$, the intruder aircraft 206 has just encroached on, or intersected with, the SST 210 of the UAS 204. That is, separation distance between the UAS 204 and the intruder aircraft 206 has come within a predefined SST distance, defined by the SST 210. Thus, at the current time for the illustrated second location $L_2$, embodiments of the sense and avoid system 200 determine the closest point of approach (CPA) between the UAS 204 and the intruder aircraft 206.

The closest point of approach between the UAS 204 and the intruder aircraft 206 is defined by two points, the CPA point 218 associated with the UAS 204 and the CPA point 220 associated with the intruder aircraft 206. The CPA separation distance 222 is the distance between the CPA point 218 and the CPA point 220.

In this hypothetical example, the CPA point 220 associated with the intruder aircraft 206 is to the left of UAS 204 current flight path 202. In the simplified example of FIG. 2, embodiments of the sense and avoid system 200 will recommend that the UAS 204 implement a right hand turn to increase the CPA separation distance 222 in accordance with accepted right-of-way rules (where the vehicle to the right of the UAS 204 has the right of way). Preferably, the UAS 204 will turn so as to maintain a separation distance such that the projected path 208 of the intruder aircraft 206 will not intersect the CAT 212 (in view of an adjusted flight path of the UAS 204 recommended by the sense and avoid system 200).

FIG. 2 illustrates an alternative flight path 224 of the intruder aircraft 206 corresponding to a situation wherein the intruder aircraft 206 is implementing a lateral turning maneuver to its right. The right hand turn of the intruder aircraft 206 along the projected flight path 224 results in determination of a CPA point 222. Here, the intruder aircraft 206 at the CPA point 222 is still to the left of UAS 204 flight path 202, so UAS 204 still turns to the right.

Accordingly, embodiments of the sense and avoid system 200 determine which way to turn the UAS 204 in accordance with the blocks 120, 122, and 124 of the flow chart 100 (FIG. 1). If a current position for the intruder aircraft 206 is within the SST 210 and if the CPA point is to the left of the flight path 202 of the UAS 204, the sense and avoid system 200 determines that the UAS 204 should turn to the right. If the current position is within the SST 210 and if the CPA point is to the right of the flight path 202 of the UAS 204, the sense and avoid system 200 determines that the UAS 204 should turn to the left. In the simplified example illustrated in FIG. 2, the sense and avoid system 200 determines that the UAS 204 should turn to the right since the CPA point 220 is to the left of the flight path 202 of the UAS 204.

Often, a monitored intruder aircraft may not cross into the SST 210, either because of a large separation distance, because of flight altitude differences, and/or because of divergent flight paths between the UAS 204 and the intruder aircraft 206. In such situations, the UAS 204 may stay on its original flight path 202. That is, the original flight path 202 of the UAS 204 does not need to be modified to maintain a safe distance from the intruder aircraft 206 (which is intuitively apparent upon a comparison of the projected current flight path of the intruder aircraft 206 with the flight path 202 of the UAS 204).

In some situations, the projected path of the intruder aircraft 206 may intersect with the optional SFRT 214 of the UAS 204. If the intruder aircraft is within the SFRT 214, the UAS implements a lateral maneuver in accordance with 14 CFR 91.113. That is, the UAS implements a lateral maneuver to turn the UAS to the right with respect to the intruder aircraft. If intruder aircraft 206 is not within the SFRT 214, a lateral maneuver and/or a vertical maneuver may be recommended by the sense and avoid system 200 to maximize the minimum distance at CPA. This alternative maneuver may not be in accordance with the aviation regulations (14 CFR 91.113) or guidelines but is accepted practice and improves safety.

In some situations, the path of the intruder aircraft 206 may enter within the CAT 212 of the UAS 204. In such situations, the UAS 204 may implement an evasive vertical maneuver that is in accordance with the aviation regulations or guidelines to avoid a mid air collision with the intruder aircraft 206. For example, but not limited to, when current position of the intruder aircraft 206 is within the CAT 212 of the UAS 204, and when the UAS 204 is above the intruder aircraft 206 (at a higher altitude), the UAS 204 may implement a rapid ascent (pull up) in accordance with the blocks 106, 108 of the flow chart 100 (FIG. 1). On the other hand, when the UAS 204 is below the intruder aircraft 206 (at a lower altitude), the UAS 204 may implement a rapid descent (dive) in accordance with the blocks 106, 110 of the flow chart 100.

Figure 7:
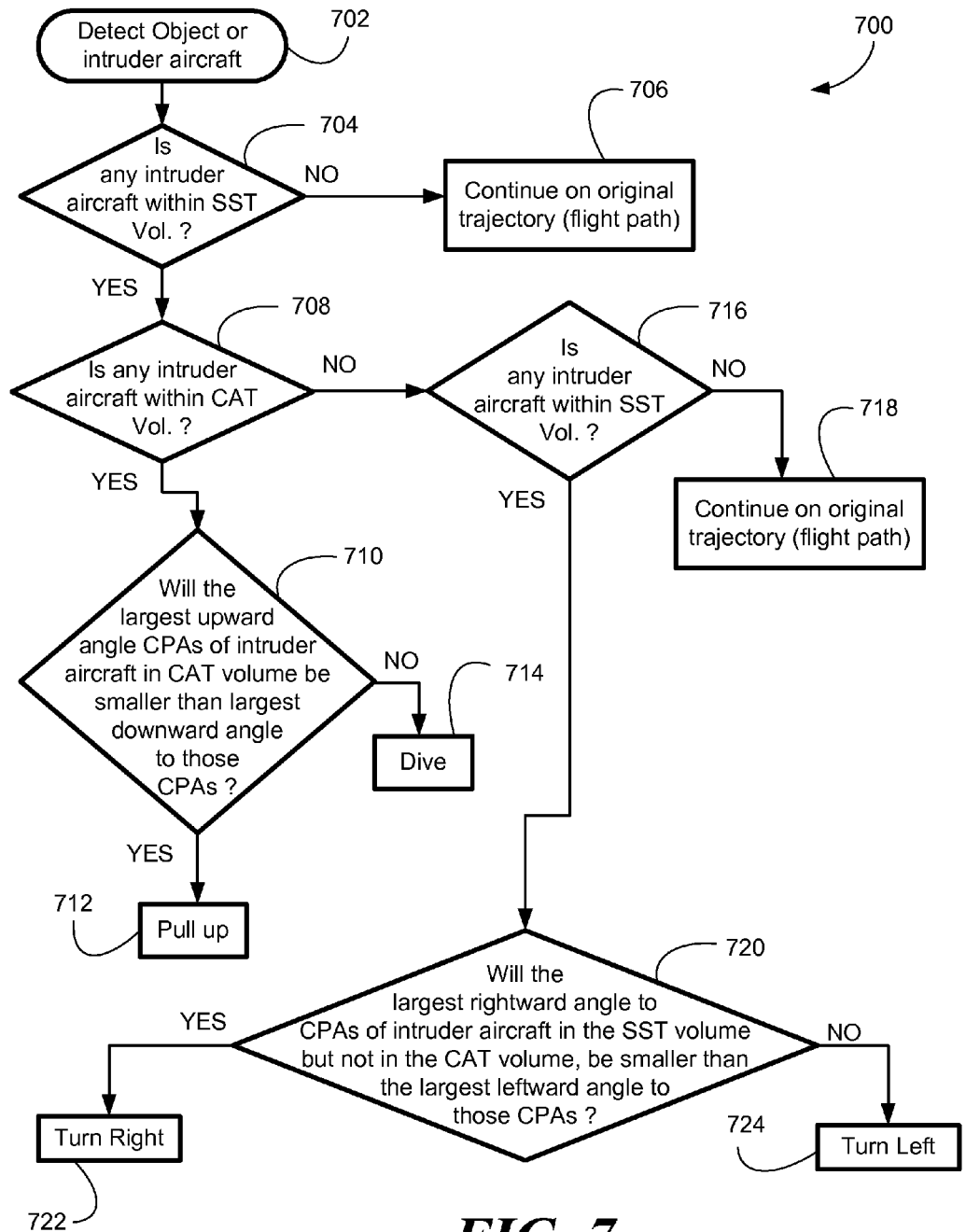
FIG. 7 is a flowchart illustrating operation of exemplary software logic that may be used to implement an example embodiment of the sense and avoid system when multiple intruder aircraft may be in proximity to the UAS.

Summarizing, embodiments of the sense and avoid system 200 are configured to facilitate operation of the UAS 204 in a manner that maintains at least a proscribed distance away from objects of interest, such as other intruder aircraft. More particularly, embodiments of the sense and avoid system 200 are configured to more closely emulate the experience and common sense of the crew of manned aircraft when exercising accepted right-of way practices during flight in regions of airspace with one or more intruder aircraft during flight conditions corresponding to the blocks 124, 126, and 128 of the flow chart 100 (FIG. 1) for a single intruder case. A more general multiple intruder case is shown in chart 700 (FIG. 7).

Figure 3:
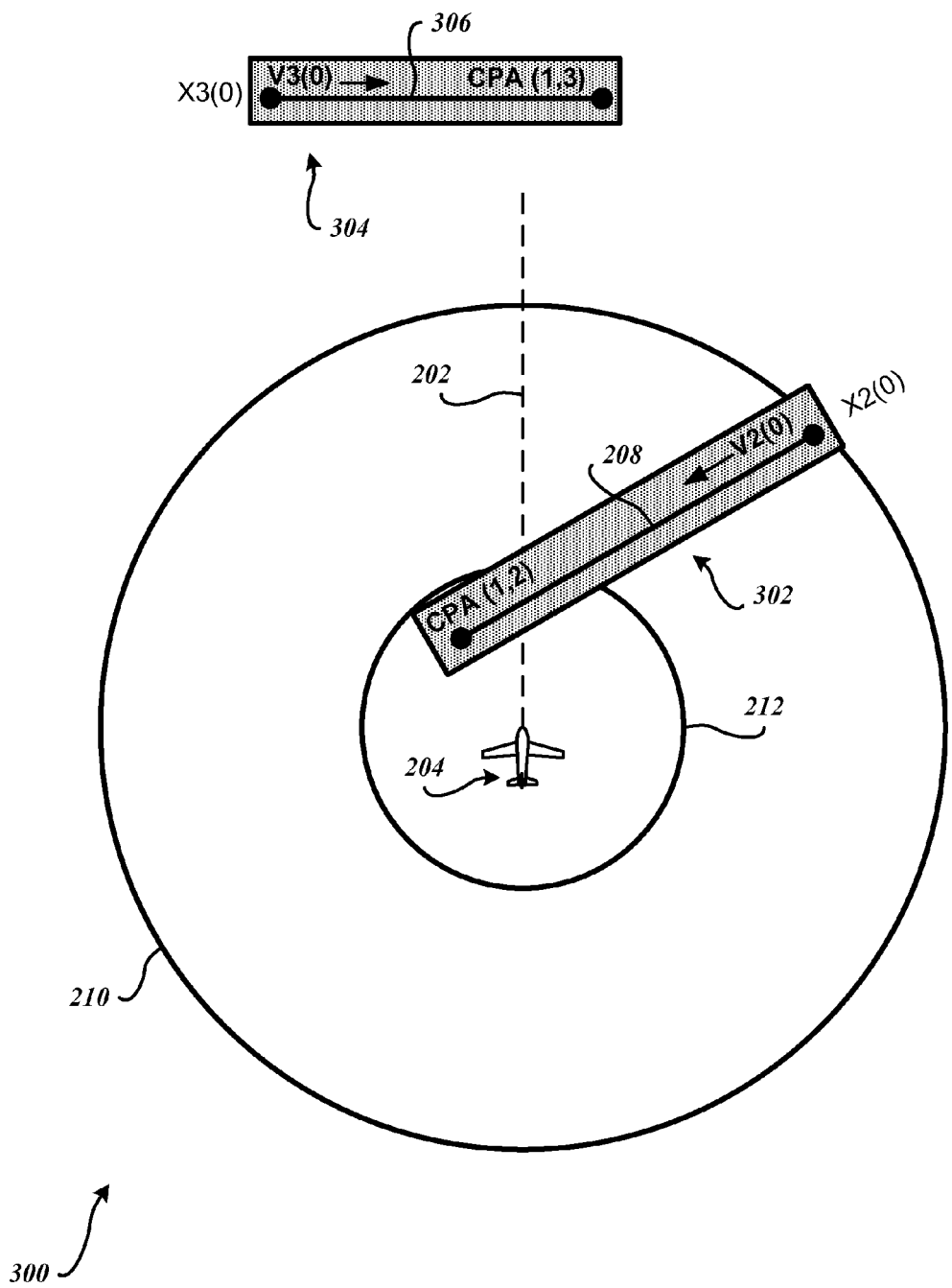
FIG. 3 illustrates a flight path vector diagram associated with the flight path of an example intruder aircraft.

FIG. 3 illustrates a flight path vector diagram 300 associated with the flight path 208 of the example intruder aircraft 206. Here, projected current flight paths of intruder aircraft 206 are represented as vector diagrams. The exemplary flight path vector diagram 300 graphically depicts several characteristics of the projected current flight paths of detected intruder aircraft. These characteristics are graphically indicated using a flight path vector. The vector diagrams illustrate computational representation of the projected current flight paths of intruder aircraft that are compared with the planned (current) flight path 202 of the UAS 204. A flight path vector diagram may be generated as a visual aid to present information about other objects.

In FIG. 3, an example flight path vector 302 is illustrated for the example intruder aircraft 206 shown in FIG. 2. Flight path 302 consists of three vectors: position vector $X2(0)$ is the location of the first intruder at current time $T_0$, velocity vector $V2(0)$ is the velocity of the first intruder at current time $T_0$, position vector $CPA(1,2)$ is the position vector of the first intruder at some future time of closest approach Here, the location of the intruder aircraft 206 at the current time $T_0$ is illustrated as just on the SST 210 boundary at the current time $T_0$ (see also FIG. 2). The numeral "2" in the various labels of the components of the example flight path vector 302 is associated with the intruder aircraft 206. The label $X2(0)$ is associated with the initial location of the flight path vector 302 of the intruder aircraft 206 at the current time. Accordingly, embodiments of the sense and avoid system 200 will determine the CPA of the intruder aircraft 206 with the UAS 204 since the current location of the intruder aircraft 206 is understood to have intersected with the SST 210 at the current time $T_0$.

The determined CPA of the intruder aircraft 206 to the UAS 204 is indicated as the point marked "CPA $(1,2)$" on the illustrated flight path vector 302. The label "$(1,2)$" indicates the reference direction of the CPA point. That is, the label "CPA $(1,2)$" nomenclature indicates reference of the location of the intruder aircraft 206 (vehicle 2) to the UAS 204 (vehicle 1) at the CPA.

The velocity of the intruder aircraft 206 is optionally shown, using the label "$V2(0)$" to indicate the velocity vector at the current time $T_0$. The distance between position vector $X2(0)$ and position vector $CPA(1,2)$, is only indirectly related to the length of velocity vector $V2(0)$, since $\|X2(0)-CPA(1,2)\|=\|V2(0)\|*$(time until closest approach).

In an example embodiment, an advisory display corresponding to the example flight path diagram 300 showing the three vectors associated with a segment of flight path 302, the SST 210, and the CAT 212 may be generated and then graphically presented to the operator of the UAS 204 to impart information about the detected intruder aircraft 206. In embodiments implemented in manned aircraft, the flight path vector diagram 300 may be presented to the crew of the self aircraft or other individuals, such as the controllers at an airport.

For illustration purposes, a second intruder aircraft is represented in FIG. 3 by the flight path 304, consisting of three vectors, $X3(0)$, $V3(0)$ and $CPA(1,3)$. Here, the example second intruder aircraft is associated with the numeral 3, and its location at the current time is indicated at the vector location $X3(0)$. The projected flight path of this third intruder aircraft is seen to be towards the right at an initial velocity vector of $V3(0)$. For discussion purposes, the CPA vector of the example third intruder aircraft to the UAS 204 is hypothetically indicated at the point CPA $(1,3)$.

FIG. 3 illustrates that the second intruder aircraft's current position, $X3(0)$ does not intersect the SST 210 of the UAS 204. Accordingly, preferred embodiments do not calculate the CPA $(1,3)$ for the second intruder aircraft (since it does not currently intersect the SST 210 of the UAS 204). However, FIG. 3 does illustrate that by the time that the second intruder aircraft finally arrives at its respective CPA with the UAS 204, that the UAS 204 will pass safely behind the second intruder aircraft. Thus, the UAS 204 may not need to deviate from its planned flight path 202.

Further, it is appreciated that the plan view of FIG. 3 does not indicate relative altitudes between the UAS 204 and the first or the second intruder aircraft. Depending upon the embodiment, altitude information may be considered. Further, altitude and/or relative altitude information may be presented using suitable labels on a flight path vector diagram.

Figure 4:
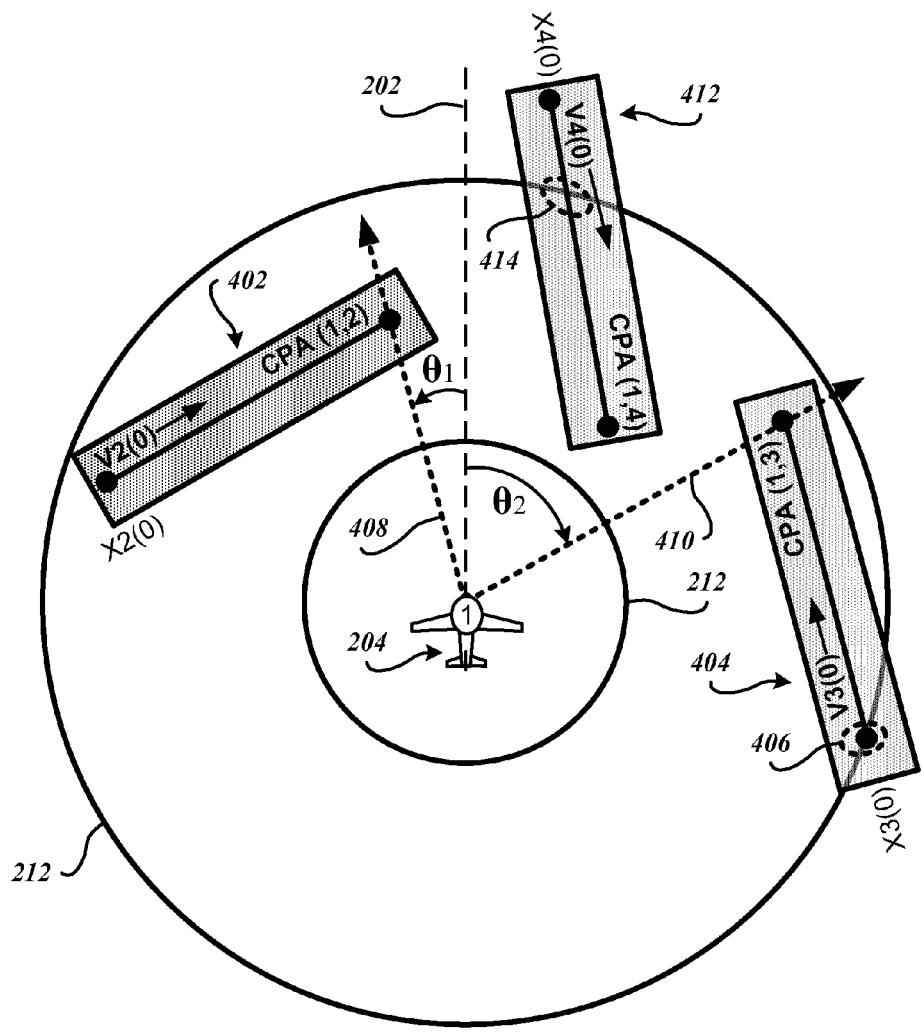
FIG. 4 is a flight path vector diagram illustrating presence of multiple intruder aircraft.

FIG. 4 is a flight path vector diagram 400 illustrating presence of multiple intruder aircraft. The plan view of FIG. 4 corresponds to a current time. When a plurality of intruder aircraft are identified, embodiments of the sense and avoid system 200 will concurrently evaluate the predicted current flight paths of each of the plurality of intruder aircraft with the current flight path 202 of the UAS 204, using logic shown in FIG. 7.

A first intruder aircraft is indicated by the flight path 402, which consists of two position vectors, X2(0) and CPA(1,2) and a velocity vector V2(0). Here, the projected flight path of the first intruder aircraft indicates that the first intruder aircraft is traveling in a direction that is towards the flight path 202 of the UAS 204. The numeral 2 is associated with this first intruder aircraft (since the numeral 1 is already associated with the UAS 204). The current velocity of the first intruder aircraft is indicated by the value "V2(0)" on the flight path 402.

The current location of the first intruder aircraft is denoted by the location vector "X2(0)" on the flight path 402. Of note, the location vector X2(0) is shown to be on the inside of the SST 210 of the UAS 204. Accordingly, it is understood that at a previous time period (corresponding to the time that the first intruder aircraft initially crossed over the SST 210), the CPA (1,2) would have been previously calculated by the sense and avoid system 200, and the flight path vector 402 may have previously been shown to the operator of the UAS 204.

Assuming that the velocities of the self aircraft and the first intruder aircraft had not changed since the initial time of computation of the CPA (1,2), the location of the CPA (1,2) would not have changed. Thus, some embodiments do not re-compute the CPA (1,2) during the current time intervals in which the velocities of both the self aircraft and the first intruder aircraft are constant, however, whenever the self aircraft makes an evasive maneuver, the CPAs will all have to be recalculated. Alternatively, some embodiments recomputed the CPA (1,2) for each time interval, and then present an updated flight path vector 402 with a new updated CPA (1,2). Alternatively, some embodiments of the sense and avoid system 200 monitor the velocities of both the self aircraft and the first intruder aircraft. If either the velocities of either the self aircraft or t the first intruder aircraft change by some threshold amount, then the CPA (1,2) is recomputed for that time interval, and then is presented as an updated flight path vector 402 with a new updated CPA (1,2).

A second intruder aircraft is indicated on the flight path vector diagram 400 by the flight path 404. Here, the projected flight path of the second intruder aircraft indicates that the current position X3(0) and the CPA(1,3) future position of the second intruder aircraft is towards the right of the flight path 202 of the UAS 204, even though the velocity vector V3(0) has a component towards the left. The numeral 3 is associated with this second intruder aircraft (since the numerals 1 and 2 are already associated with the UAS 204 and the first intruder aircraft, respectively). The current velocity of the second intruder aircraft is indicated by the value "V3(0)" on the flight path vector 404.

The current location of the second intruder aircraft is denoted by the location vector "X3(0)" on the flight path 404. Of note, the location vector X2(0) is shown to be on the boundary of the SST volume 210 of the UAS 204. Accordingly, it is understood that at this current time, the second intruder aircraft has initially crossed over the boundary of the SST 210 volume, as indicated by the circled region 406 in FIG. 4. Here, the CPA (1,3) is initially calculated by the sense and avoid system 200, and the flight path 404 is now being shown to the operator of the UAS 204.

Optionally, vectors or other indicators may be presented to the operator of the UAS 204. For example, an indicator may be presented which indicates an angle between the computed CPAs and the flight path 202 of the UAS 204. In FIG. 4, an indicator line 408 indicates that the CPA (1,2) associated with the first intruder aircraft is to the left of the flight path 202 of the UAS 204. A turn angle $\theta_1$ associated with the line 408 indicates a measure of a turn to the left that the UAS 204 might opt to make to avoid the first intruder aircraft. It is appreciated that the UAS 204 turning to the left would also avoid the second intruder aircraft.

Similarly, an indicator line 410 indicates that the CPA (1,3) associated with the second intruder aircraft is to the right of the flight path 202 of the UAS 204. A turn angle $\theta_2$ associated with the line 410 indicates a measure of a turn to the right that the UAS 204 might opt to make to avoid the second intruder aircraft.

When multiple intruder aircraft flight paths are indicated on a presented plan view, the operator of the UAS 204 may quickly and intuitively be able to select a right turn or a left turn that avoids all of the intruder aircraft. Alternatively, or additionally, the sense and avoid system 200 may recommend the right or the left turn. If the operator wishes to take the least deviation from the original (or current) flight path 202, then the operator will choose to make the turn that is associated with the smaller of the presented turn angles. In FIG. 4, the operator would turn to the left since the turn angle $\theta_1$ associated with the first intruder aircraft is less than the indicated turn angle $\theta_2$ associated with the second intruder aircraft. The logic that the automated sense-and-avoid system would use to make this multiple-intruder turn decision is shown in FIG. 7, which is a modification of FIG. 1.

For illustration purposes, a third intruder aircraft is indicated by the flight path vector 412. Here, the projected flight path of the third intruder aircraft indicates that the third intruder aircraft is traveling in a direction that is towards and to the right of the flight path 202 of the UAS 204. The numeral 4 is associated with this second intruder aircraft (since the numerals 1, 2 and 3 are already associated with the UAS 204, the first intruder aircraft, and the second intruder aircraft, respectively). The current velocity of the third intruder aircraft is indicated by the value "V4(0)" on the flight path vector 412.

The current location of the third intruder aircraft is denoted by the location of "X4(0)" on the flight path 412. Of note, the location X4(0) is shown to be outside of the SST 210 volume of the UAS 204. Accordingly, it is understood that at this current time, the separation distance associated with the third intruder aircraft is greater than the SST 210 (or more generally, the third intruder is outside SST volume 210, which need not be spherical). Accordingly, embodiments of the sense and avoid system 200 would not have computed the closest point of approach for the example third intruder aircraft, nor would the flight path 412 be presented to the operator. Rather, the flight path 412 is shown in FIG. 4 for illustration purposes.

However, the flight path 412 further illustrates that at a later time, the third intruder aircraft will intersect the SST 210 of the UAS 204, as indicated by the circled region 414 in FIG. 4. That is, the separation distance between the third intruder aircraft and the UAS 204 will decrease, and then will eventually become equal to the distance proscribed by the SST 210. At that later time, the CPA (1,3) would be then calculated by the sense and avoid system 200, and the flight paths vectors 412 may then be shown to the operator of the UAS 204.

In the various embodiments, a shadowed area around each of the displayed flight path vector sets may be used by some embodiments to provide for a degree of margin. Such margin may account for sensor errors or other errors in the current flight path information of the intruder aircraft.

As noted herein, various embodiments of the sense and avoid system 200 compute a closest point of approach for intruder aircraft. In an example embodiment, the closest point of approach may be computed as follows.

Assuming that all aircraft remained on straight-line trajectories starting at current time, $t_0$, then the closest point of approach (CPA) between aircraft 1 and aircraft i would be given by:

$$CPA_{1,i} = x_1(t_0)) + v_1(t_0)\delta t_{1,i} \quad (1)$$

where $\delta t_{1,i}$ is the time of closest approach minus the current time. Let the current differences in position and velocity be given by:

$$\delta x_{1,i} = x_1(t_0)) - x_i(t_0)$$

$$\delta v_{1,i} = v_1(t_0) - v_i(t_0) \quad (2)$$

Then the distance squared between aircraft 1 and aircraft i changes with time as:

$$\|[x_1(t_0) + v_1(t_0)\delta t_{1,i}] - [x_i(t_0) + v_i(t_0)\delta t_{1,i}]\|^2 = \quad (3)$$
$$\|[x_1(t_0) - x_i(t_0)] + [v_1(t_0) - v_i(t_0)]\delta t_{1,i}\|^2 = \|\delta x_{1,i} + \delta v_{1,i}\delta t_{1,i}\|^2 =$$
$$(\delta x_{1,i})^T \delta x_{1,i} + 2(\delta x_{1,i})^T \delta v_{1,i}\delta t_{1,i} + (\delta v_{1,i})^T \delta v_{1,i}(\delta t_{1,i})^2$$

Setting the derivative with respect to $\delta t_{1,i}$ equal to zero gives:

$$0 = 2(\delta x_{1,i})^T \delta v_{1,i} + 2(\delta v_{1,i})^T \delta v_{1,i}\delta t_{1,i} \quad (4)$$

So the future point of closest approach happens at time:

$$\delta t_{1,i} = \max\left(0, \frac{-(\delta x_{1,i})^T \delta v_{1,i}}{(\delta v_{1,i})^T \delta v_{1,i}}\right) \quad (5)$$

The smallest position difference between the pair of aircraft is given by:

$$\delta x_{1,i} + \delta v_{1,i}\delta t_{1,i} = \left(I - \frac{\delta v_{1,i}(\delta v_{1,i})^T}{(\delta v_{1,i})^T \delta v_{1,i}}\right)\delta x_{1,i} \quad (6)$$

if $\delta t_{1,i} \geq 0$ i.e.
if $(\delta x_{1,i})^T \delta v_{1,i} \leq 0$ $$rangerate = \left(\frac{\delta x_{1,i}}{\|\delta x_{1,i}\|}\right)^T \delta v_{1,i} \quad (7)$$

So when the range rate is negative, the closest future separation of two vehicles travelling on straight lines is the current separation minus the projection of the current separation along the line of the velocity difference. By turning until range rate increases to zero, future minimum separation can be kept as large as possible.

Using the $\delta t_{1,i}$ value in the CPA formula gives the closet point of approach in terms of current positions and velocities:

$$CPA_{1,i} = x_1(t_0) + v_1(t_0)\max\left(0, \frac{-(\delta x_{1,i})^T \delta v_{1,i}}{(\delta v_{1,i})^T \delta v_{1,i}}\right) \quad (8)$$

Alternative embodiments of the sense and avoid system 200 may use any suitable process, algorithm, or method to determine flight paths and/or closest point of approaches.

Figure 5:
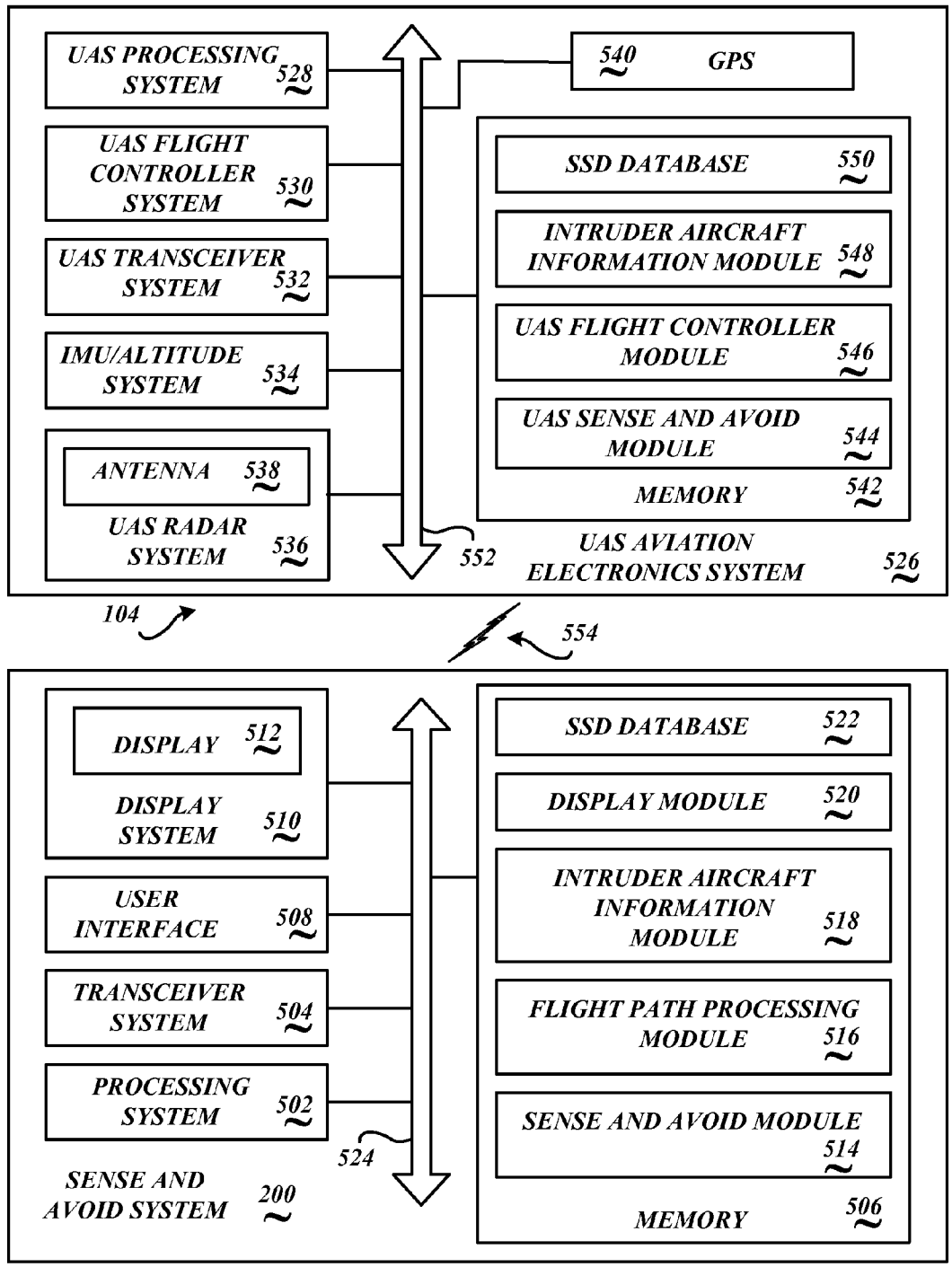
FIG. 5 is a block diagram of an example embodiment of the sense and avoid system.

FIG. 5 is a block diagram of an example embodiment of the sense and avoid system 200 that is configured to facilitate remote control operation of the UAS 204. The example embodiment of the sense and avoid system 200 resides in the operation facility where the operator is controlling flight of the UAS 204. The exemplary embodiment of the sense and avoid system 200 comprises a processing system 502, a transceiver system 504, a memory 506, an optional user interface 508, an optional display system 510 which presents visual information on a display 512. The memory 506 comprises portions for storing a sense and avoid module 514, a flight path processing module 516, an intruder aircraft information module 518, an optional display module 520, and a Self Separation Distance (SSD) database 522. The processing system 502, the transceiver system 504, the memory 506, the optional user interface 508, the optional display system 510 and/or the display 512 are communicatively coupled via the communication bus 524, thereby providing connectivity between the above-described components. In alternative embodiments of the sense and avoid system 200, the above-described components may be communicatively coupled to each other in a different manner. For example, one or more of the above-described components may be directly coupled to the processing system 502, or may be coupled to the processing system 502 via intermediary components (not shown). Further, additional components (not shown) may be included in alternative embodiments of the sense and avoid system 200. In alternative embodiments, the logic of modules 514, 516, 518, and/or 520 may reside in another suitable memory medium (not shown). Such memory may be remotely accessible by the sense and avoid system 200. Alternatively, or additionally, the logic of modules 514, 516, 518, and/or 520 may reside in a memory of another processing system (not shown). Further, the logic of modules 514, 516, 518, and/or 520 may be integrated together and/or integrated with other logic. In an alternative embodiment, the entire sense-and-avoid system 200 could be onboard a totally autonomous UAS, with no ground station and/or no remote operator The amount of the proscribed Self Separation distance, and any additional margin, is based on adopted flight rules and regulations governing flight of aircraft in the airspace. Such proscribed Self Separation distances and their associated flight conditions may be predefined and stored by the sense and avoid system 200. The proscribed Self Separation distances may be variable based on the current velocity of the UAS 204. Additionally, or alternatively, the proscribed Self Separation distances may vary based upon the velocity of the intruder aircraft. The proscribed Self Separation distance(s) associated with the SST 212 (FIG. 2) are stored in the SSD database 522 in an example embodiment. Further, information corresponding to the Collision Avoidance threshold (CAT) 212 volume, the optional standard flight rules threshold (SFRT) 214 volume and the near-miss avoidance collision (NMAC) threshold 216 may reside in the SSD database 522.

Further illustrated in FIG. 5 is a UAS aviation electronics system 526 that resides on the UAS 204 (FIG. 1). The non-limiting example UAS aviation electronics system 526 comprises a UAS processing system 528, a UAS flight controller system 530, a UAS transceiver system 532, an inertial measurement unit (IMU)/altitude system 534, an optional radar system 536 with an antenna 538 (interchangeably referred to as a surveillance system, tough any suitable surveillance system providing surveillance information may be used in the various embodiments), an optional global positioning system (GPS) 540, and a memory 542. The memory 542 comprises portions for storing an optional UAS sense and avoid module 544, a UAS flight controller module 546, an intruder aircraft information module 548, and an optional SSD database 550 (which stores proscribed Self Separation distances). The UAS processing system 528, the UAS flight controller system 530, the UAS transceiver system 532, the IMU/altitude system 534, the optional radar system 536, the antenna 538, the optional global positioning system (GPS) 540, and/or the memory 542 are communicatively coupled via the communication bus 552, thereby providing connectivity between the above-described components. In alternative embodiments of the UAS aviation electronics system 526, the above-described components may be communicatively coupled to each other in a different manner. For example, one or more of the above-described components may be directly coupled to the UAS processing system 528, or may be coupled to the UAS processing system 528 via intermediary components (not shown). Further, additional components (not shown) may be included in alternative embodiments of the UAS aviation electronics system 526. In alternative embodiments, the logic of modules 544, 546 and/or 548 may reside in another suitable memory medium (not shown). Such memory may be remotely accessible by the sense and avoid system 200. Alternatively, or additionally, the logic of modules 544, 546 and/or 548 may reside in a memory of another processing system (not shown). Further, the logic of modules 544, 546 and/or 548 may be integrated together and/or integrated with other logic.

In an example embodiment where the sense and avoid system 200 resides at the operation facility, the UAS 204 is remotely controlled by the remote UAS operator at the operation facility. Accordingly, the transceiver system 504 and the UAS transceiver system 532 are configured to communicate with each other via the wireless signal 554. In the various embodiments, transceivers 504, 532 are communication devices or systems configured to receive and transmit radio frequency (RF) signals. It is appreciated that any suitable transceiver device or system may be used, and that the transceivers 504, 532 may have a variety of components therein which are not described or illustrated herein for brevity. For example, but not limited to, transceivers 504, 532 may include as components a receiver and a transmitter device or system. Further, such components themselves may be separate devices or systems.

Further, the transceivers 504, 532 may be configured to receive communications from other transceivers, such as transceivers residing in the example intruder aircraft 206. For example, the intruder aircraft 206 may be broadcasting its location information (such as coordinates determined by an onboard GPS system), flight path bearing information (interchangeably referred to as heading information), altitude information, and/or velocity information (airspeed and/or ground speed). Further, the broadcast may include intent information indicating a change in a planned flight path, a planned altitude, or planned velocity of the intruder aircraft. The information broadcasted by the intruder aircraft 206 may be used to determine a modified plight path of the intruder aircraft, which may then be used to determine a modified flight path for the UAS 206 to maintain proscribed Self Separation distances from the UAS 204 and the intruder aircraft 206.

In the example embodiment, the processing system 502 retrieves and executes the various logic residing in the modules 514, 516, 518, 520, or other modules (not shown). The UAS processing system 528 retrieves and executes the various logic residing in the modules 544, 546, 548, or other modules (not shown). The modules reside as firmware, software or other computer-readable medium executed by processing systems 502, 528. Processing systems 502, 528 may be a specially designed and/or fabricated processing system, or a commercially available processing system.

The user interface 508 permits the remote UAS operator to remotely control the flight of the UAS 204. The optional display system 510 provides graphic information presented on the display 512 that is viewable by the remote UAS operator. For example, the display system 510 may emulate a cockpit radar system display that is viewed by the crew of manned aircraft. Alternatively, or additionally, the display system 510 may present a flight path vector diagram on the display 512 that emulates the simplified hypothetical plan view of the flight path vector diagram 400 illustrated in FIG. 4. The display system 510 may concurrently, or alternatively, present other information of interest to the remote UAS operator, such as, but not limited to, velocity, flight path bearing, altitude or the like of the UAS 204 and/or the intruder aircraft 206. Projected flight paths of the UAS 204 and/or the intruder aircraft 206, and/or one or more recommended modified flight paths as determined by embodiments of the sense and avoid system 200 for the UAS 204, may also be presented on the display 512. Display of information presented by the display system 510 is managed by the display module 520 residing in the memory 506.

In some embodiments, particularly when the display system 510 is omitted, the UAS 204 will be configured to fly autonomously. That is, software will manage the flight of the autonomous UAS 204 such that direct and/or constant operator control is not required for at least some phases of flight. In such embodiments, determining the CPA becoming less than the SST, determining whether the current separation distance between the intruder aircraft and the self aircraft is greater than the CAT, and determining whether the CPA to the intruder aircraft is to the left of a flight path of the self aircraft or to the right of the flight path of the self aircraft is performed by the processing system 528 at the UAS and is based on the radar information generated by the radar system 536 at the UAS (interchangeably referred to as surveillance information generated by any suitable surveillance system).

The intruder aircraft information module 518 (and/or intruder aircraft information module 548) is configured to process information pertaining to identified potential intruder aircraft, such as the example intruder aircraft 206, and/or other objects of interest. The intruder aircraft information module 518 (and/or intruder aircraft information module 548) determines a projected flight path for known intruder aircraft based on the current flight path bearing, current altitude, current velocity and current location of each intruder aircraft. The intruder aircraft information may be obtained in a variety of manners.

In an example embodiment, the UAS 204 is provisioned with an on-board UAS radar system 536. The UAS radar system 536 may be any suitable radar system, such as, but not limited to, a weather radar that is operable to detect weather that is located relatively far away from the UAS 204. The UAS radar system 536 includes the antenna 538 that is operable to emit radar pulses and to receive radar returns. A radar return is reflected energy from an object, such as the example intruder aircraft 206, upon which the emitted radar pulse is incident on. The antenna 538 is swept in a back-and-forth motion, in an up and down direction, and/or in other directions of interest, such that the UAS radar system 536 is able to detect objects, such as intruder aircraft and/or other objects of interest in proximity to the UAS 204.

In an example embodiment, received radar returns are processed into surveillance information generated by any suitable surveillance system (such as the radar information by the UAS radar system 536) and/or the UAS processing system 532 executing the intruder aircraft information module 548. The radar information may indicate the current location and/or current altitude of the detected intruder aircraft 206. Over some time interval, velocity and flight path bearing of the intruder aircraft 206 may be determined. Accordingly, a projected flight path of the intruder aircraft 206 may be determined therefrom. The information describing the flight information of the intruder aircraft 206 may be determined at the UAS aviation electronics system 526, and then communicated to the sense and avoid system 200 residing in the operation facility via the wireless signal 554. Alternatively, or additionally, the UAS aviation electronics system 526 may communicate the radar return information to the sense and avoid system 200, via the wireless signal 554, such that the flight information of the intruder aircraft 206 is determined at the operation facility by the processing system 502 executing the intruder aircraft information module 518.

Alternatively, or additionally, other radar systems (not shown), such as one or more ground-based radar systems or radar systems on other aircraft, may provide flight path bearing, altitude, and/or velocity information of the intruder aircraft 206 to the sense and avoid system 200 such that the flight information of the intruder aircraft 206 may be determined at the operation facility by the processing system 502 executing the intruder aircraft information module 518. Thus, the various embodiments of the sense and avoid system 200 analyze the relative position, flight path bearing, and/or velocity of the intruder aircraft 206 with respect to the current location, flight path bearing, altitude and/or velocity of the UAS 204.

In some UAS 204, an embodiment of the intruder aircraft information module 548 is implemented in the UAS 204 itself. Such types of UAS 204 may be configured to operate more independently of the remote UAS operator located at the operation facility, and may even be manned. Accordingly, the UAS 204 may cooperatively operate the UAS flight controller module 546 and the intruder aircraft information module 548 to determine, and then implement, modified flight paths to comply with accepted right-of way rules upon detection of one or more intruder aircraft, particularly in situations where the remote UAS operator has not provided sufficient flight operating information in a timely manner (e.g., a failure to timely provide the flight operating information to implement a determined modified flight path to maintain proscribed separation distances from the example intruder aircraft 206). Alternatively, or additionally, the UAS 204 may determine and implement a modified flight path to maintain proscribed separation distances from the example intruder aircraft 206 as an automatic maneuver during an emergency situation, such as when one of the intruder aircraft 206 suddenly and unexpectedly alters its current flight path bearing, altitude, and/or velocity. In some embodiments, the entire sense-and-avoid system 200 may be implemented onboard the UAS 204 (and a redundant version in the ground station), so that if the communications link with the ground station is lost, the UAS 204 can still avoid collisions with intruder aircraft.

In an example embodiment, the UAS 204 includes the GPS 540. The GPS 540 is configured to determine current location of the UAS 204. Over a period of time, the information provided by the GPS 540 may be used to determine the current flight path bearing and/or velocity of the UAS 204. Supplemental information may be provided by the IMU and altitude system 534. For example, a suitable altimeter in the IMU/altitude system 534 may provide current altitude information. Accelerometers and/or gyroscopes in the IMU/altitude system 534 may provide information to track changes in the current location and/or flight path bearing of the UAS 204.

Figure 6:
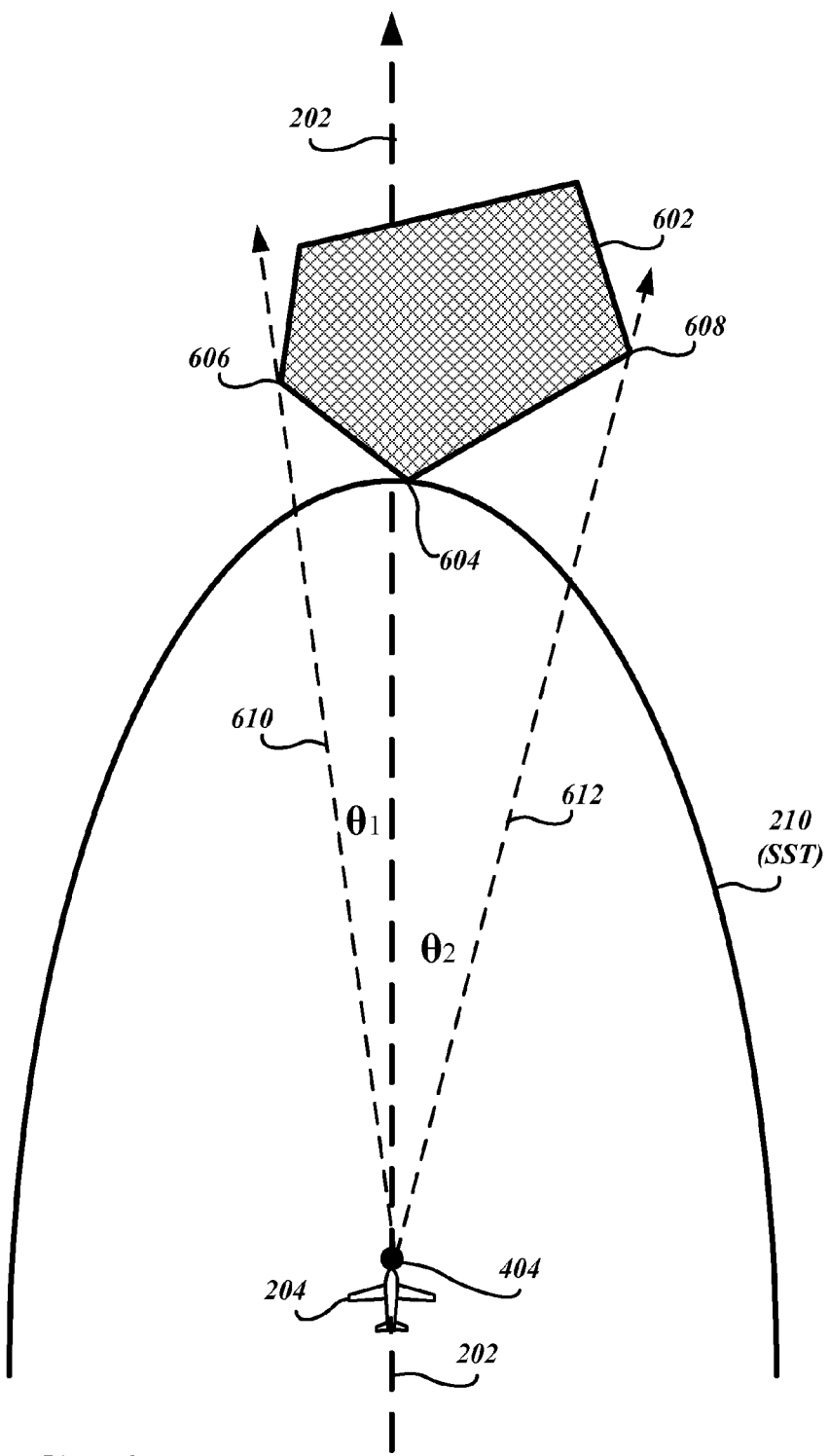
FIG. 6 is a simplified hypothetical plan view of a flight path of the UAS with respect to stationary objects, such as, but not limited to, an example restricted airspace.

FIG. 6 is a simplified hypothetical plan view of a flight path 202 of the UAS 204 with respect to stationary objects, such as, but not limited to, the example restricted airspace 602. The restricted airspace 602 defines a geographic area that the UAS 204 should not travel over and/or through. The boundaries or other information identifying the extent of the restricted airspace 602 may be stored in a database resident in the memories 206 and/or 226. Alternatively, the boundaries or other information identifying the extent of the restricted airspace 602 may by communicated to the sense and avoid system 200 as the UAS 204 nears the restricted airspace 602.

The exemplary restricted airspace 602 has at least three points of interest, a leading edge point 604 which identifies the portion of the restricted airspace 602 which first intersects the Self Separation Threshold (SST) 210, a left-most extent point 606 that identifies the farthest left side extent of the restricted airspace 602 with respect to the current flight path 202, and a right-most extent point 608 that identifies the farthest right side extent of the restricted airspace 602 with respect to the current flight path 202.

To avoid the restricted airspace 602, the UAS 204 must either turn to the left along the modified flight path 610 or turn to the right along the modified flight path 612. Embodiments of the sense and avoid system 200 determine a modified flight path 610 based on the location of the left-most extent point 606 and determine a modified flight path 612 based on the location of the right-most extent point 608. The preferred turn is the turn having the least turn angle. Here, the modified flight path 610 is associated with the turn angle $\theta_1$ and the modified flight path 612 is associated with the turn angle $\theta_2$. Since the turn angle $\theta_1$ is less than the turn angle $\theta_2$, the modified flight path 610 is selected as the preferred modified flight path.

In an example embodiment, when the SST 210 of the UAS 204 initially intersects with the restricted airspace 602, the UAS 204 identifies a location of the leading edge point 604 of the restricted airspace 602. Then, embodiments identify the left-most extent point 606 and the right-most extent point 608 of the restricted airspace 602. Optionally, the turn angles $\theta_1$ and $\theta_2$ may then be determined. Embodiments may then recommend a lateral maneuver to turn the UAS 204 onto the selected modified flight path 610, 612.

In some embodiments, limitations may be imposed on the amount of and/or the degree of the angular change of a lateral and/or a vertical turn associated with a selected modified flight path. For example, vertical velocity of the climb of the modified flight path may be limited to +/−2000 feet per minute. Vertical accelerations may be limited to −0.2 G and +0.5 G. Lateral acceleration is limited to +/−0.4 G. Acceleration commands can be integrated to give velocity commands. A turn angle may be limited to some predefined value, such as, but not limited to, 60 degrees(60°). Any limitations may be imposed by embodiments of the sense and avoid system 200. Further, in some embodiments, a plurality of limitations may be used. Such limitation may be prioritized with respect to each other such that some limits apply only after other limits are reached. Further, some flight conditions may be identified such that the limitations may be overridden. For example, the vertical velocity and/or acceleration limit may be overridden to avoid a mid-air collision.

To avoid switching back and forth between deciding to turn left and turn right, a dead-band may be used by embodiments of the sense and avoid system 200. That is, the decision output from the sense and avoid system 200 should not switch between "turn left" and "turn right" until the inputs have changed by at least the amount of the measurement uncertainty. In an example embodiment, a dead-band of 12 degrees is employed, though any suitable angle range may be used.

In some embodiments, if the closest point of approach falls within the dead-band, a default turn to the right is initiated by the UAS 204. Alternatively, a default turn is initiated so that the UAS 204 passes behind and/or above the identified intruder aircraft. Any suitable default turn may be used by the various embodiments of the sense and avoid system 200.

Alternatively, or additionally, embodiments may limit the time between updates of selecting a modified flight path (e.g., changing of the turn left/right decision). For example, changes to a newly determined preferred modified flight path would be limited to once every 10 seconds. Any suitable limitation duration may be employed in the various embodiments.

FIG. 7 is a flowchart 700 illustrating operation of exemplary software logic that may be used to implement an example embodiment of the sense and avoid system when multiple intruder aircraft may be in proximity to the UAS 204. In this regard, each block may represent a module, segment, or portion of code, which comprises one or more executable instructions for implementing the specified logical function(s). It should also be noted that in some alternative implementations, the functions noted in the blocks may occur out of the order noted in FIG. 7, may include additional functions, and/or may omit some functions. For example, two blocks shown in succession in FIG. 7 may in fact be executed substantially concurrently, the blocks may sometimes be executed in the reverse order, or some of the blocks may not be executed in all instances, depending upon the functionality involved. All such modifications and variations are intended to be included herein within the scope of this disclosure.

With respect to FIG. 7, the process of the flowchart 700 begins at block 706 in response to detecting an intruder aircraft (or other object of interest). At block 704, a determination is made whether the range rate is negative. If the range rate is not negative, the UAS continues along its original trajectory (flight path), as indicated at block 706. However, if the range rate is negative (the YES condition), the process continues to block 708.

At block 708, a determination is made whether any intruder aircraft are within the CAT volume. If one or more intruder aircraft are within the CAT (the YES condition), a closest point of approach (CPA) is then determined and the process proceeds to block 710.

At block 710, a determination is made whether the largest upward angle to the CPAs of intruder aircraft will be in the CAT volume, and will be smaller than the largest downward angle to those CPAs. If yes, the UAS pulls up (implements a vertical maneuver that increases altitude of the UAS) as indicated at block 712. If not (the NO condition), the UAS dives (implements a vertical maneuver that decreases altitude of the UAS) as indicated by the block 714.

Alternatively, if at block 708, the intruder aircraft is not within the CAT volume (the NO condition), the process proceeds to block 716. At block 716, a determination is made whether the one or more intruder aircraft are inside a Self Separation Threshold (SST) volume. Here, a separation distance between an intruder aircraft and a self aircraft is monitored, and the separation distance is then compared to the SST to determine if the separation distance has become equal to the SST. The proscribed separation distance defined by the SST volume is defined as a last possible moment that the UAS could maneuver to maintain "well clear" from all other intruder aircraft at all times during its flight. In this instantiation, "well clear" is defined as the CAT. That is, Self Separation is trying to minimally avoid the CAT. Other embodiments may choose a different definition of "well clear". If not (the NO condition), the UAS continues along its original trajectory (flight path), as indicated at block 718. However, if the intruder aircraft is within the SST volume (the YES condition), the CPA is determined and the process proceeds to block 720.

At block 720, a determination is made whether the largest rightward angle to the CPAs of the intruder aircraft will be in the SST volume, but not the CAT volume, and be smaller than the largest leftward angle to those CPAs. If yes, the UAS turns to the right, as indicated by block 722. On the other hand, if not (the NO condition), the UAS turns to the left, as indicated by block 724. These lateral maneuvers in accordance with blocks 722, 724 may, in some instances, be contrary to established right-of-way rules. In other instances, the lateral maneuvers of blocks 722, 724 will result in the same turn directions of established right-of-way rules.

Alternative implementations of the sense and avoid system 200 may be in other embodiments. As one non-limiting example, an embodiment may determine consecutive intruder aircraft 206 locations relative to relative locations of a UAS 204. The consecutive relative locations of the intruder aircraft 206 to the UAS 204 may be based on current velocities of the intruder aircraft 206 and the UAS 204, and/or may be based on current flight paths of the intruder aircraft 206 and the UAS 204. That is, at any moment from a current time of monitoring to some relevant time in the future, relative locations between the intruder aircraft 206 and the UAS 204 may be determined. The flight paths provide information pertaining to the bearings of the intruder aircraft 206 and the UAS 204. Also, the velocities of the intruder aircraft 206 and the UAS 204 will be pertinent to determining the relative locations between the intruder aircraft 206 and the UAS 204 as is appreciated by one skilled in the art of aircraft navigation. That is, the determined separation distances are based on the consecutive intruder aircraft locations relative to the corresponding locations of the self aircraft. Based on the determined relative locations between the intruder aircraft 206 and the UAS 204, at least one evasive maneuver for the self aircraft is computed, wherein the at least one maneuver comprises a left turn or a right turn.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method, comprising:
    monitoring separation distances between an intruder aircraft and a self aircraft, the monitoring comprising;

periodically determining a current separation distance between an intruder aircraft and a self aircraft, wherein the current separation distance is a distance between the intruder aircraft and the self aircraft determined at a current time during the monitoring; and comparing the current separation distance to a Self Separation Threshold (SST), wherein the SST is a predefined distance between the intruder aircraft and the self aircraft, wherein the monitoring determines when the monitored separation distance is less than or equal to the SST;

determining a closest point of approach (CPA) between the intruder aircraft and the self aircraft in response to the current separation distance becoming less than or equal to the SST;

determining whether the current separation distance between the intruder aircraft and the self aircraft is greater than a Collision Avoidance Threshold (CAT)

determining whether the CPA to the intruder aircraft is to a left of a flight path of the self aircraft or to a right of the flight path of the self aircraft in response to the current separation distance becoming less than the SST, wherein the self aircraft turns left when performing Self Separation and the CPA to the intruder aircraft is determined to be to the right of the flight path of the self aircraft, and wherein the self aircraft turns right when performing Self Separation and the CPA to the intruder aircraft is determined to be to the left of the flight path of the self aircraft, wherein the self aircraft climbs when performing Collision Avoidance and the CPA to the intruder aircraft is determined to be below the flight path of the self aircraft and wherein the self aircraft descends when performing Collision Avoidance and the CPA to the intruder aircraft is determined to be above the flight path of the self aircraft.

2. The method of claim 1, wherein determining the CPA comprises:

determining a current flight path of the intruder aircraft based on a current bearing of the intruder aircraft and a current velocity of the intruder aircraft; and comparing the flight path of the self aircraft with the determined current flight path of the intruder aircraft to determine separation distances between the self aircraft and the intruder aircraft as each traverses along their respective flight paths, wherein the CPA corresponds to the location of the intruder aircraft at a shortest determined separation distance between the self aircraft and the intruder aircraft as each traverses along their respective flight paths.

3. The method of claim 1, wherein the self aircraft is an unmanned aircraft system (UAS).

4. The method of claim 3, further comprising:
communicating flight operating information from a ground station to the UAS via a wireless signal, wherein the flight operating information operates the UAS in accordance with a maneuver.

5. The method of claim 4, further comprising:
communicating surveillance information from a surveillance system on the UAS to the ground station via the wireless signal, wherein determining whether the current separation distance between the intruder aircraft and the self aircraft is less than the SST determining whether the current separation distance between the intruder aircraft and the self aircraft is less than the CAT, determining whether the CPA to the intruder aircraft is to the left of the flight path of the self aircraft or to the right of the flight path of the self aircraft, and determining whether the CPA to the intruder aircraft is above or below the flight path of the self aircraft or to the right of the flight path of the self aircraft is performed by a processing system at the ground station and is based on the surveillance information received from the UAS.

6. The method of claim 3, wherein the UAS is an autonomous UAS, and further comprising:

generating the surveillance information from a radar system on the UAS, wherein determining whether the current separation distance between the intruder aircraft and the self aircraft is less than the SST, determining whether the current separation distance between the intruder aircraft and the self aircraft is less than the CAT, determining whether the CPA to the intruder aircraft is to the left of the flight path of the self aircraft or to the right of the flight path of the self aircraft, and determining whether the CPA to the intruder aircraft is above or below the flight path of the self aircraft or to the right of the flight path of the self aircraft is performed by a processing system at the UAS and is based on the surveillance information generated at the UAS.

7. The method of claim 1, wherein the intruder aircraft is a first intruder aircraft, wherein the current separation distance is a first current separation distance, wherein the CPA between the first intruder aircraft and the self aircraft is a first CPA, the method further comprising:

monitoring a second current separation distance between a second intruder aircraft and the self aircraft concurrently with the monitoring of the first current separation distance between the first intruder aircraft and the self aircraft;

comparing the second current separation distance to the SST;

determining a second CPA between the second intruder aircraft and the self aircraft in response to the second current separation distance becoming less than the SST;

determining whether the second current separation distance between the second intruder aircraft and the self aircraft is greater than the CAT;

in response to the second current separation distance becoming less than the SST and in response to determining that the second current separation distance is greater than the CAT, determining whether the CPA to the second intruder aircraft is to the left of the flight path of the self aircraft or to the right of the flight path of the self aircraft, wherein the self aircraft turns in the direction of smallest horizontal angle to CPA of the first and second intruder aircraft, and in response to the second current separation distance becoming less than the CAT, determining whether the CPA to the second intruder aircraft is to above the flight path of the self aircraft or below the flight path of the self aircraft, wherein the self aircraft maneuvers vertically in the direction of smallest vertical angle to CPA of the first and second intruder aircraft.

8. The method of claim 1, further comprising:
identifying restricted airspace that defines a geographic area that the self aircraft should not travel over, wherein the restricted airspace is defined by a leading edge point which identifies a portion of the restricted airspace which first intersects the SST with respect to the flight path of the self craft, a left-most extent point that identifies a farthest left side extent of the restricted airspace with respect to the flight path of the self aircraft, and a right-most extent point that identifies a farthest right side extent of the restricted airspace with respect to the flight path of the self aircraft;

determining a first modified flight path assuming the self aircraft makes a turn to the right to avoid the farthest right side extent of the restricted airspace; and determining a second modified flight path assuming the self aircraft makes a turn to the left to avoid the farthest left side extent of the restricted airspace;

wherein the self aircraft turns left when the turn to the right is greater than the turn to the left, and wherein the self aircraft turns right when the turn to the right is less than the turn to the left.

9. The method of claim 8, further comprising:

determining a magnitude of a first turn angle based on the first modified flight path, wherein the magnitude of the first turn angle defines the magnitude of the turn to the right to avoid the farthest right side extent of the restricted airspace;

determining a magnitude of a second turn angle based on the second modified flight path, wherein the magnitude of the second turn angle defines the magnitude of the turn to the left to avoid the farthest left side extent of the restricted airspace; and comparing the magnitude of the first turn angle with the magnitude of the second turn angle, wherein the self aircraft turns left when the magnitude of the first turn angle is greater than the magnitude of the second turn angle, and wherein the self aircraft turns right when the magnitude of the first turn angle is less than the magnitude of the second turn angle.

10. The method of claim 1, wherein the monitoring of the current separation distance between the intruder aircraft and the self aircraft comprises:

determining a range rate of the intruder aircraft, wherein a negative range rate indicates that the intruder aircraft is getting closer to the self aircraft, and wherein a positive range rate indicates that the intruder aircraft is getting farther from the self aircraft; and continuing flight along the flight path of the self aircraft in response to determining that the range rate of the intruder aircraft is positive, wherein determining the current separation distance between the intruder aircraft and the self aircraft is performed in response to determining that the range rate of the intruder aircraft is negative.

11. The method of claim 1, in response to the current separation distance becoming less than the SST and in response to determining that the current separation distance is less than the CAT, the method further comprising:

determining whether the self aircraft is at a higher altitude or a lower altitude than the intruder aircraft;

determining that the self aircraft should implement a rapid ascent in response to determining that the self aircraft is at the higher altitude, and determine that the self aircraft should implement a rapid descent in response to determining that the self aircraft is at the lower altitude.

12. A system, comprising:

an unmanned aircraft system (UAS) that is configured to fly over terrain without a crew;

a surveillance system configured to detect proximity of an intruder aircraft to the UAS;

a processing system configured to receive information from the surveillance system, wherein the processor system is configured to:

periodically determine a current separation distance between the intruder aircraft and the UAS, wherein the current separation distance is a distance between the intruder aircraft and the UAS at a current time that the current separation distance is determined;

compare the current separation distance to a Self Separation threshold (SST), wherein the SST is a predefined distance between the intruder aircraft and the UAS;

determine a closest point of approach (CPA) between the intruder aircraft and the UAS in response to the current separation distance becoming less than the SST, wherein the CPA is determined based on the predicted flight path of the UAS and the predicted flight path of the intruder aircraft; and determine whether the CPA to the intruder aircraft is to a left of the current flight path of the self aircraft or to a right of the current flight path of the self aircraft in response to the current separation distance becoming less than the SST, wherein the self aircraft turns left when the CPA to the intruder aircraft is determined to be to the right of the current flight path of the self aircraft, and wherein the self aircraft turns right when the CPA to the intruder aircraft is determined to be to the left of the current flight path of the self aircraft.

13. The system of claim 12, wherein the processing system is further configured to:

determine whether the current separation distance between the intruder aircraft and the UAS is less than a Collision Avoidance Threshold (CAT);

determine whether the CPA to the intruder aircraft is above the current flight path of the self aircraft or below the current flight path of the self aircraft in response to the current separation distance becoming less than the CAT, wherein the self aircraft climbs when the CPA to the intruder aircraft is determined to be below the current flight path of the self aircraft, and wherein the self aircraft descends when the CPA to the intruder aircraft is determined to be above the current flight path of the self aircraft.

14. The system of claim 12, wherein the surveillance system and the processing system reside in the UAS.

15. The system of claim 12, wherein the processing system resides in a ground station, and further comprising:

a first transceiver system residing in the UAS and configured to emit wireless signals and receive wireless signals; and a second transceiver system residing in the ground station and configured to emit wireless signals and receive wireless signals, wherein an operator controls flight of the UAS by generating control commands that are emitted from the second transceiver system and that are received by the second transceiver system.

16. The system of claim 15, wherein the surveillance system resides in the UAS, wherein the first transceiver system emits wireless signals having surveillance information generated by the surveillance system, and wherein the second transceiver system receives the wireless signals having the surveillance information that is used to determine the current separation distance between the intruder aircraft and the UAS.

17. The system of claim 15, wherein the first transceiver system receives wireless signals emitted by the intruder aircraft that has at least one of current location information, current flight path bearing information, current altitude information, current velocity information, and intent information of the intruder aircraft that indicates an intended change in the current flight path, the current altitude, and the current velocity of the intruder aircraft.

18. The system of claim 17, further comprising:
a global positioning system (GPS) residing in the UAS and configured to determine a current location of the UAS, wherein the first transceiver system emits wireless signals having location information corresponding to the current location of the UAS, and wherein the second transceiver system receives the wireless signals having the location information,
wherein the location information of the UAS and the information received from the intruder aircraft are used to determine the current separation distance between the intruder aircraft and the UAS.

19. A method, comprising:
determining consecutive intruder aircraft locations relative to corresponding locations of a self aircraft, wherein the determining is based on current velocities of the intruder aircraft and the self aircraft, and wherein the determining is based on current flight paths of the intruder aircraft and the self aircraft; and
computing using a processing system at least one evasive maneuver for the self aircraft based on the determined consecutive intruder aircraft locations relative to the corresponding locations of the self aircraft,
wherein the at least one evasive maneuver comprises one of a left turn and a right turn;
determining separation distances between intruder aircraft locations and the self aircraft based on the determined consecutive intruder aircraft locations relative to the corresponding locations of the self aircraft; comparing the separation distances to a Self Separation threshold (SST), wherein the SST is a predefined distance; and determining a closest point of approach (CPA) between the intruder aircraft and the self aircraft only after the current separation distance becomes less than the SST, wherein the self aircraft is performing Self Separation and turns left when the CPA to the intruder aircraft is determined to be to the right of the current flight path of the self aircraft, and wherein the self aircraft is performing Self Separation and turns right when the CPA to the intruder aircraft is determined to be to the left of the current flight path of the self aircraft; wherein the self aircraft is performing Collision Avoidance and climbs when the CPA to the intruder aircraft is determined to be below the current flight path of the self aircraft, and wherein the self aircraft is performing Collision Avoidance and descends when the CPA to the intruder aircraft is determined to be above the current flight path of the self aircraft.

* * * * *